US012421095B2

(12) United States Patent
Weikel et al.

(10) Patent No.: US 12,421,095 B2
(45) Date of Patent: Sep. 23, 2025

(54) PARTICULATE FUNNEL DEVICE

(71) Applicant: The High Culture LLC, Roseville, CA (US)

(72) Inventors: Krysta Weikel, Roseville, CA (US); John Dingwall, Sacramento, CA (US)

(73) Assignee: The High Culture LLC, Roseville, CA (US)

( * ) Notice: Subject to any disclaimer, the term of this patent is extended or adjusted under 35 U.S.C. 154(b) by 0 days.

(21) Appl. No.: 18/318,942

(22) Filed: May 17, 2023

(65) Prior Publication Data

US 2023/0365391 A1 Nov. 16, 2023

Related U.S. Application Data

(63) Continuation-in-part of application No. 18/101,061, filed on Jan. 24, 2023, now abandoned.

(60) Provisional application No. 63/302,305, filed on Jan. 24, 2022.

(51) Int. Cl.
*B67C 11/02* (2006.01)

(52) U.S. Cl.
CPC .................................... *B67C 11/02* (2013.01)

(58) Field of Classification Search
CPC ........................................................ B67C 11/02
See application file for complete search history.

(56) References Cited

U.S. PATENT DOCUMENTS 4,832,095 A * 5/1989 Bonnell .................. B67C 11/02 141/342
5,259,426 A * 11/1993 Burleigh ............. B25B 27/0042 141/331
2015/0136274 A1* 5/2015 Nkwantabisa .......... B67C 11/02 141/340

* cited by examiner

*Primary Examiner* — Jason K Niesz
(74) *Attorney, Agent, or Firm* — West & Associates, A PC; Stuart J. West; Charlotte Rodeen-Dickert

(57) ABSTRACT

A cone-filling device comprising an outer funnel removably connected to a trapping unit, further comprising an outer ring, an inner ring and a plurality of connecting members extending radially inward connect with said inner ring substantially concentrically. In some embodiments the inner and/or outer rings can be selectively replaceable such that the device can be user configurable.

5 Claims, 15 Drawing Sheets

102
1202
1200

1208
106
208
1204
106
206
1206
204
204
208
106
206
208
106

206
206
206
204
106
106
106
206
204
208
106
206
1212

1210

106
204
206
208

PARTICULATE FUNNEL DEVICE

CROSS-REFERENCE TO RELATED APPLICATIONS

This application is a continuation-in-part of prior-filed and co-pending U.S. patent application Ser. No. 18/101,061, filed Jan. 24, 2023 by Krysta Weikel and John Dingwall which claims priority under 35 U.S.C. § 119 to prior-filed U.S. Provisional Patent Application Ser. No. 63/302,305 filed Jan. 24, 2022 by Krysta Weikel and John Dingwall, the compete contents of each of which are hereby incorporated herein by reference.

BACKGROUND

Technical Field

The present device relates to the field of cone-filling devices, particularly filling funnels with particulate matter.

Background

Various funnel devices exist and are well known. Known funnels are configured such that they direct the funneled substance toward a single, narrow aperture at the narrow end of the funnel. Thus, the user of the funnel must insert the narrow end of the funnel to the desired thing into which the funneled substance is to be filled. However, in some circumstances, it can be difficult to use such a standard funnel to fill a flexible container, such as a smoking cone, with tabacco because the narrow end of the funnel restricts or prohibits proper filling of the smoking cone without having to withdraw the funnel end from the container, thus resulting in the substance falling out of the cone and falling to a surface and being contaminated or lost. What is needed is a funnel having a support structure adapted and configured to hold a flexible container within an enlarged funnel area and allow material that does not fall into the flexible container to continue to pass through the funnel and fall into a second container such that it can be recovered.

SUMMARY

The present device can hold a pre-rolled cone at its base to allow a user to fill said cone without having hold it. A funnel can have a trapping device at its smaller end in which to place a cone. Openings around the area holding a cone can allow particulate matter falling outside of a cone to fall into a receptacle in which particulate matter can be recovered.

BRIEF DESCRIPTION OF THE DRAWINGS

Further details of the present device are explained with the help of the attached drawings in which:

FIGS. 13*a*-13*h* depict an alternate embodiment of an alternate system or kit embodying the present device.

DETAILED DESCRIPTION

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Figure 1A:
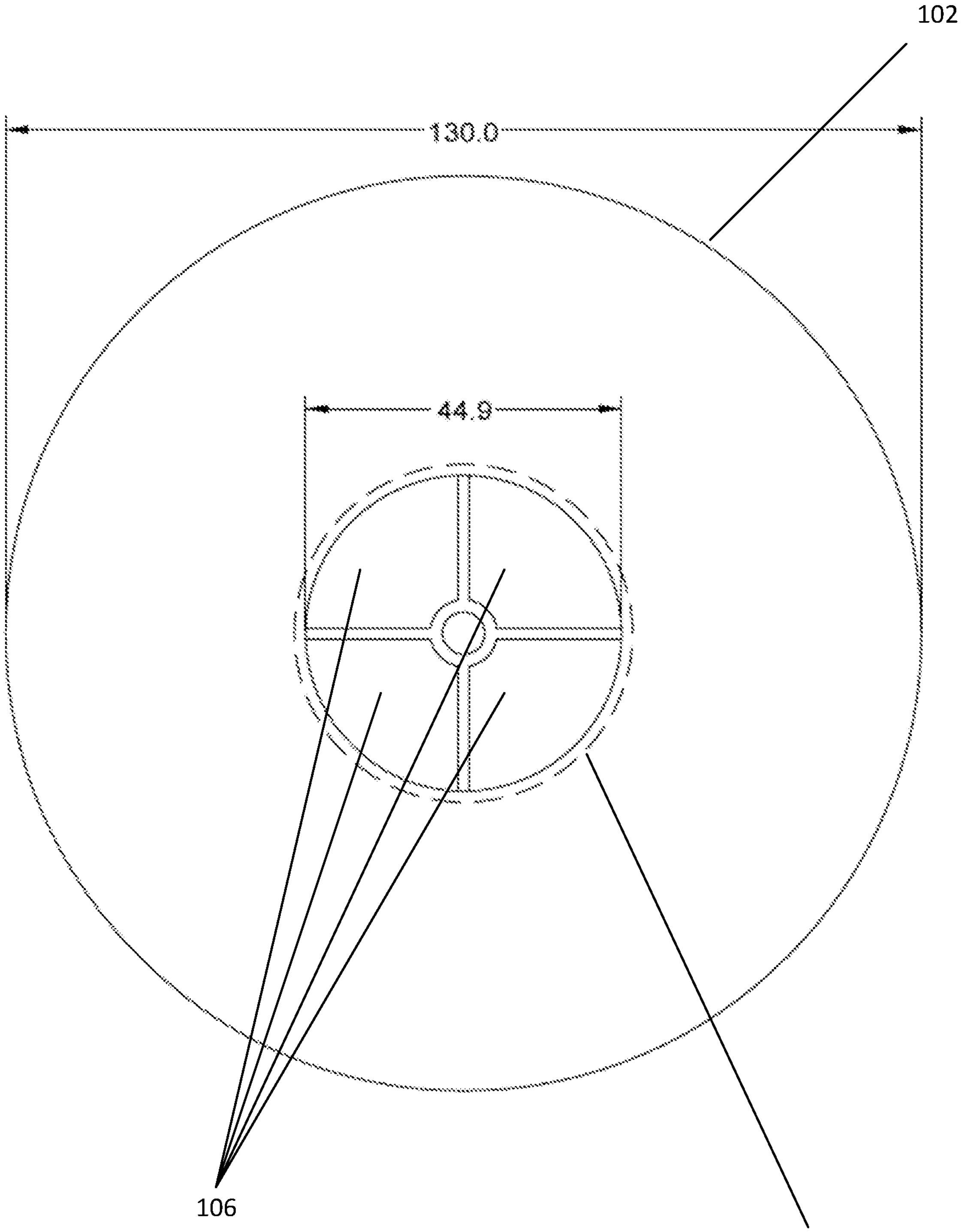
FIG. 1*a* depicts a top view of an embodiment of the present device.

FIG. 1 depicts a top planar view of an embodiment of the present device. In some embodiments, an outer funnel 102 can be an inverted truncated cone, but in other embodiments can be any other known and/or convenient geometry. A trapping unit 104 can be placed at the smaller end of an outer funnel 102 surrounded by apertures 106. As shown in FIG. 1*a*. In some embodiments, a trapping unit 104 can be positioned substantially concentrically at the outer edge of an outer funnel 102, but in other embodiments can be in any other known and/or convenient position. As shown in FIG. 1, an outer funnel 102 and a trapping unit 104 can have a substantially circular geometry, but in other embodiments can have any other known and/or convenient geometry.

Figure 1B:
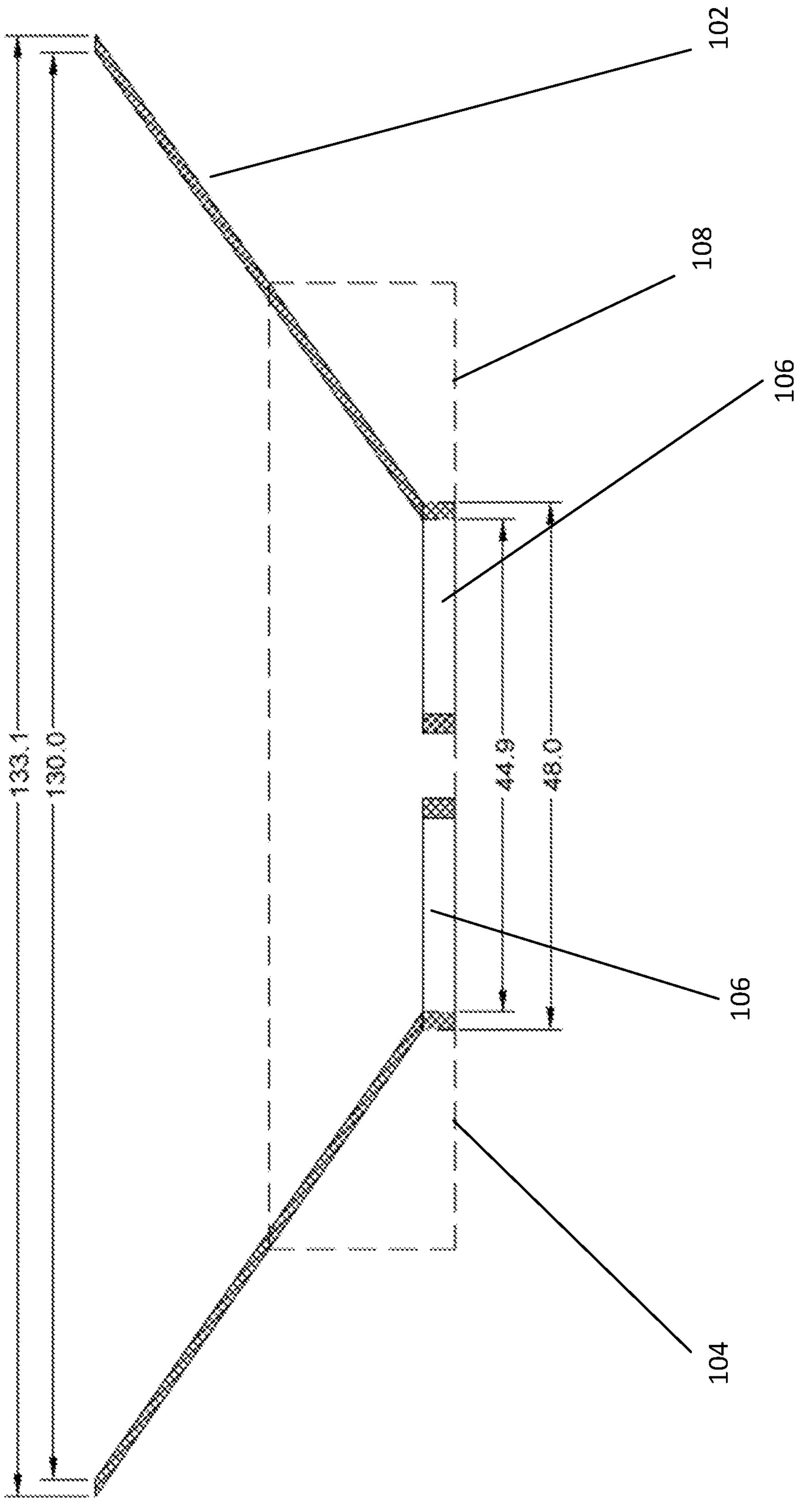
FIG. 1*b* depicts a side cross-section of the embodiment shown in FIG. 1*a*.

FIG. 1*b* depicts a side cross section of the embodiment shown in FIG. 1*a*. As shown in FIG. 1*b*, a trapping unit 104 can be removably connected to the edge of the smaller end of an outer funnel 102. In some embodiments, as shown in FIG. 1*b*, a trapping unit 104 can fit over the smaller end of an outer funnel 102, but in other embodiments can be fit on the interior surface of an outer cone 102. A trapping unit 104 can be held in place via friction fit, adhesive, set screw, or any other known and/or convenient device.

In some embodiments, an outer funnel 102 and a trapping unit 104 can be comprised of a polymer, but in other embodiments can be comprised of any other known and/or convenient material. In alternate embodiments, the number of connection members 206 can be increased (5, 6, 7, 8 . . . n).

Figure 2A:
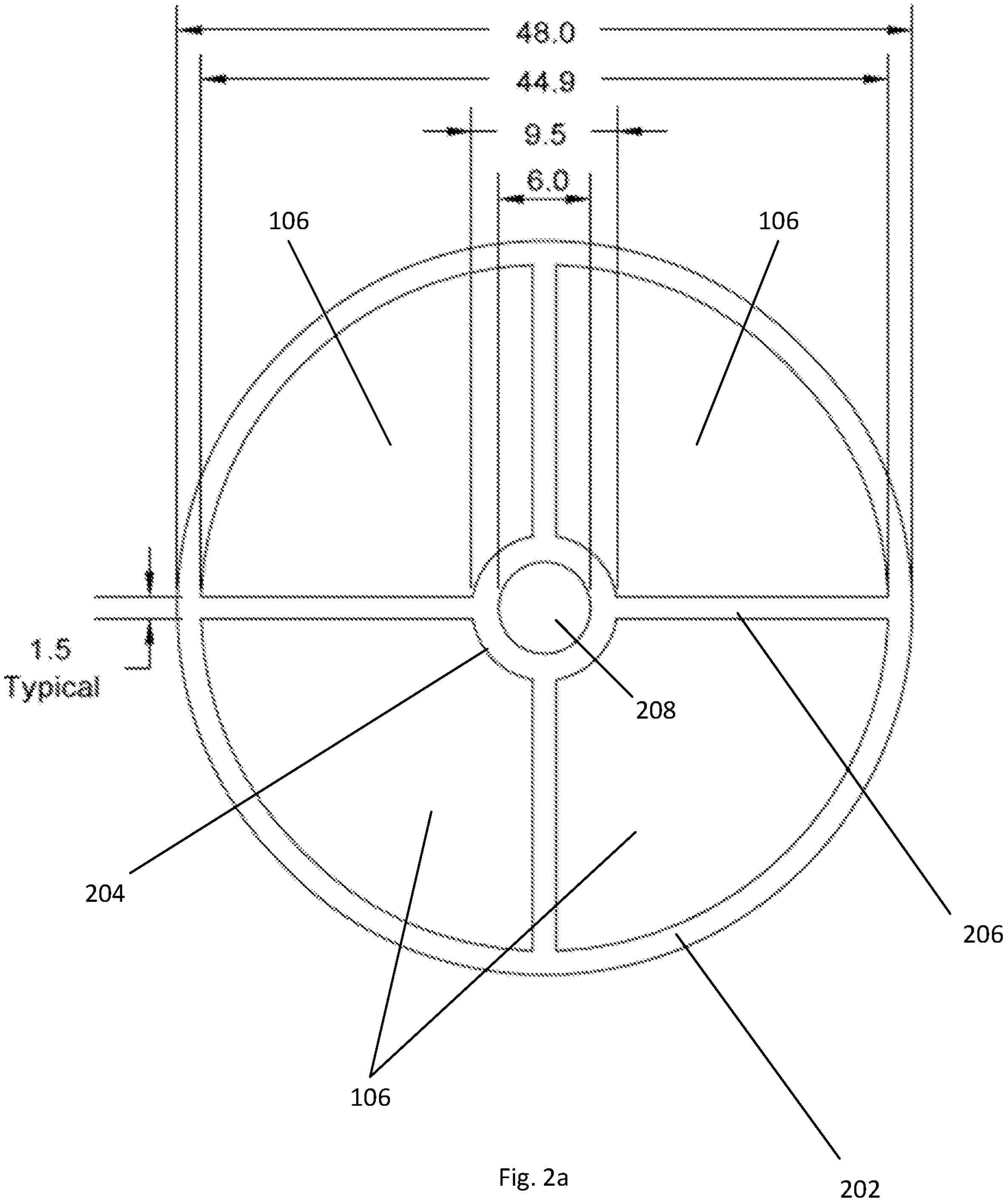
FIG. 2*a* depicts a top detail view of an embodiment of a trapping unit in the present device.

FIG. 2*a* depicts a top planar detail view of an embodiment of a trapping device 104. In some embodiments, a trapping unit 104 can further comprise an outer ring 202 that can selectively engage with the smaller end of an outer cone 102. An outer ring 202 can be substantially planar in some embodiments, but in others can have an ellipsoid, rectangular, or any other known and/or convenient geometry. In some embodiments, a plurality of connecting members 206 can extend inward from an outer ring 202 substantially radially toward an inner ring 204 defining a central aperture 208 located substantially at the center of an outer ring 202, but in other embodiments can be angles, offset, or in any other known and/or convenient arrangement and define apertures 106. As shown in the embodiment of FIG. 2*a*, there can be four connecting members 206. However, in other embodiments, there can be any other known and/or convenient number of connecting members 206. In some embodiments, connecting members 206 can have a substantially planar geometry, but in other embodiments can have an ellipsoid, rectangular, or any other known and/or convenient geometry. Connecting members 206 can have a first end connected to or integrated with an outer ring 202, and a second end connected to or integrated with an inner ring 204, as shown in FIG. 2*a*. An inner ring 204 can have a substantially planar geometry, but in other embodiments can have an ellipsoid, rectangular, or any other known and/or convenient geometry. As shown in FIG. 2*a*, an inner ring 204 can be substantially concentric with an outer ring 202, but in other embodiments can have any other known and/or convenient configuration.

Figure 2B:
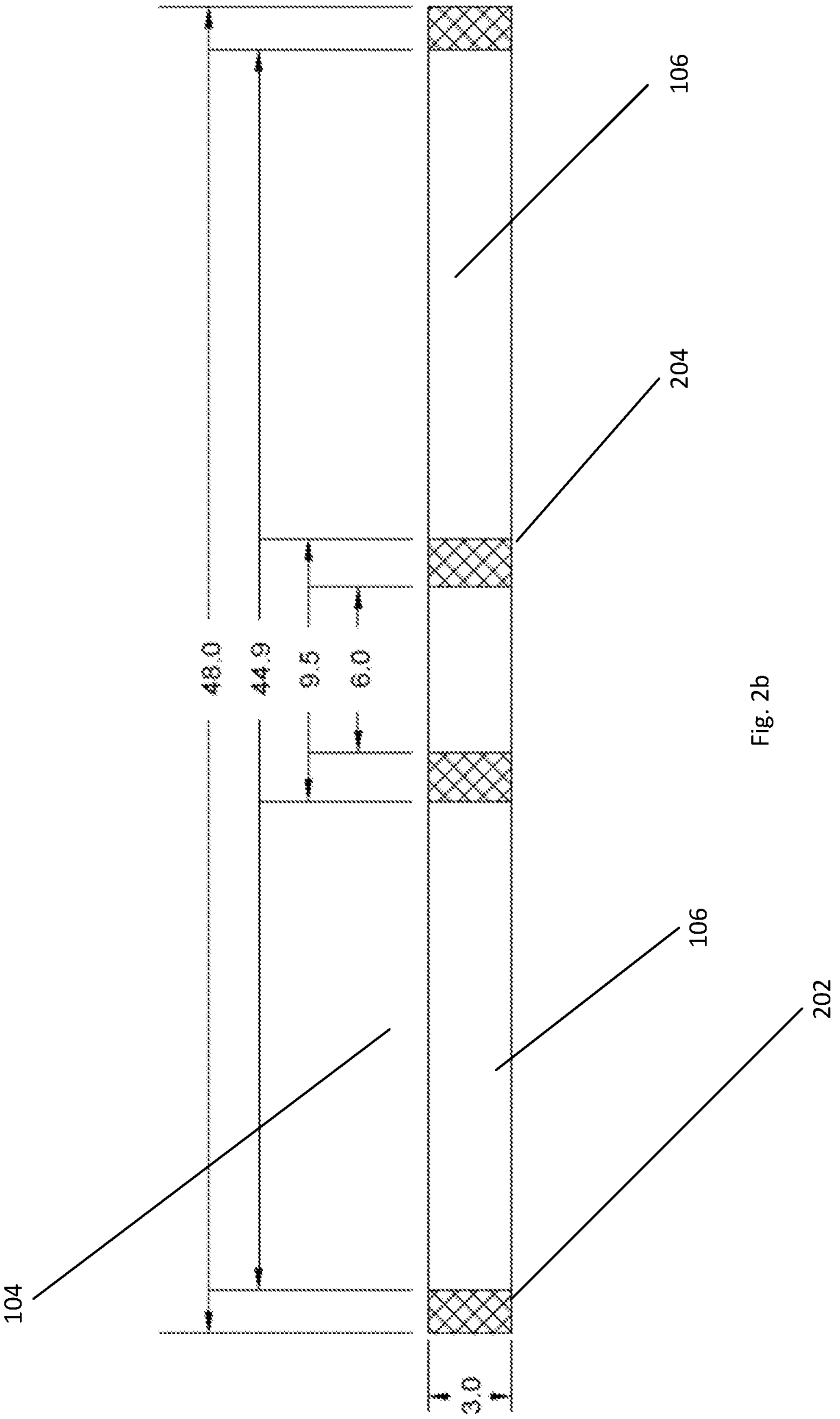
FIG. 2*b* depicts a side cross-section of the embodiment shown in FIG. 2*a*.

FIG. 2*b* depicts a side cross-section view of the embodiment shown in FIG. 2*a*. As shown in FIG. 2*b*, an outer ring 202 and an inner ring 204 can be substantially coplanar, but in other embodiments can be offset or have any other known and/or convenient configuration.

In use, a user can place the present device in the mouth of a receptacle, or as shown in FIG. 1*b*, set into the lid of such a receptacle such that the smaller end of an outer funnel 102 can sit within a receptacle. A user can then place a material with a conical geometry substantially concentrically into an inner ring 204, such that the conically configured material points downward into a receptacle. A user can then fill the conically-shaped material with particulate matter inserted from the top. Excess or stray particulate matter not landing inside the conically configured material can then be directed into a receptacle instead of falling on another surface. In alternate embodiments, the number of connection members 206 can be increased (5, 6, 7, 8 . . . n).

Figure 3:
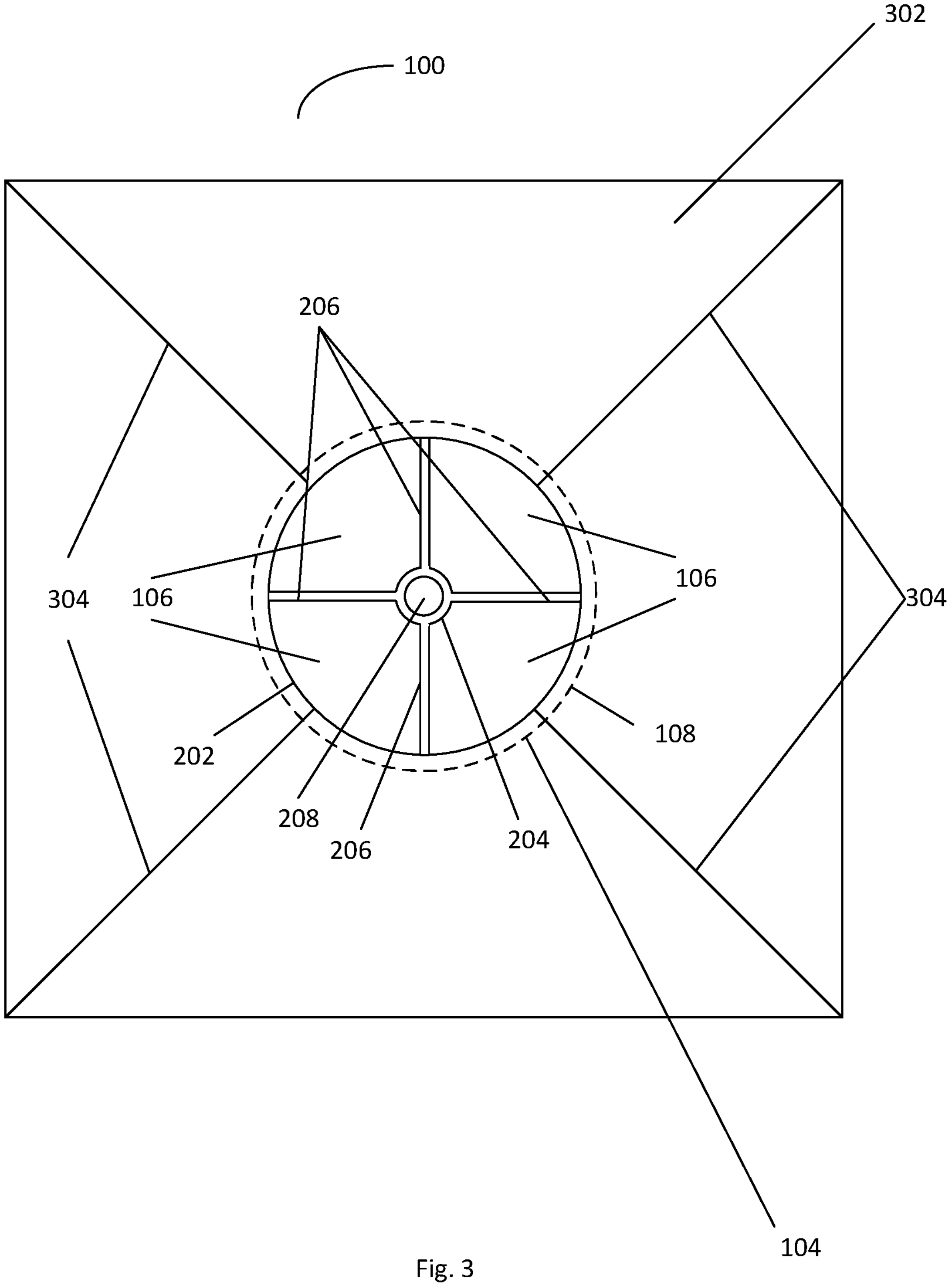
FIG. 3 depicts an alternate embodiment of the present device.

FIG. 3 depicts an alternate embodiment of the present device 100. In the embodiment depicted in FIG. 3, the outer funnel 102 depicted in FIGS. 1*a*-2*b* can be substituted with an invented, truncated pyramidal funnel 302 which can have a plurality of surfaces which engage each other along a plurality of joints 304 and which couples with the outer ring 202. However, in alternate embodiments the outer funnel 102 can have any known, convenient and/or desired geometry. Additionally, in the embodiment depicted in FIG. 3, the connecting members 206 can be positioned other than in alignment with the joints 304. While depicted as a four-sided truncated pyramidal shape in FIG. 3, the funnel 302 can have any number (3, 4, 5, 6, 7, . . . , n) of known, convenient and/or desired planar or non-planar sides. In alternate embodiments, the number of connection members 206 can be increased (5, 6, 7, 8 . . . n).

Figure 4:
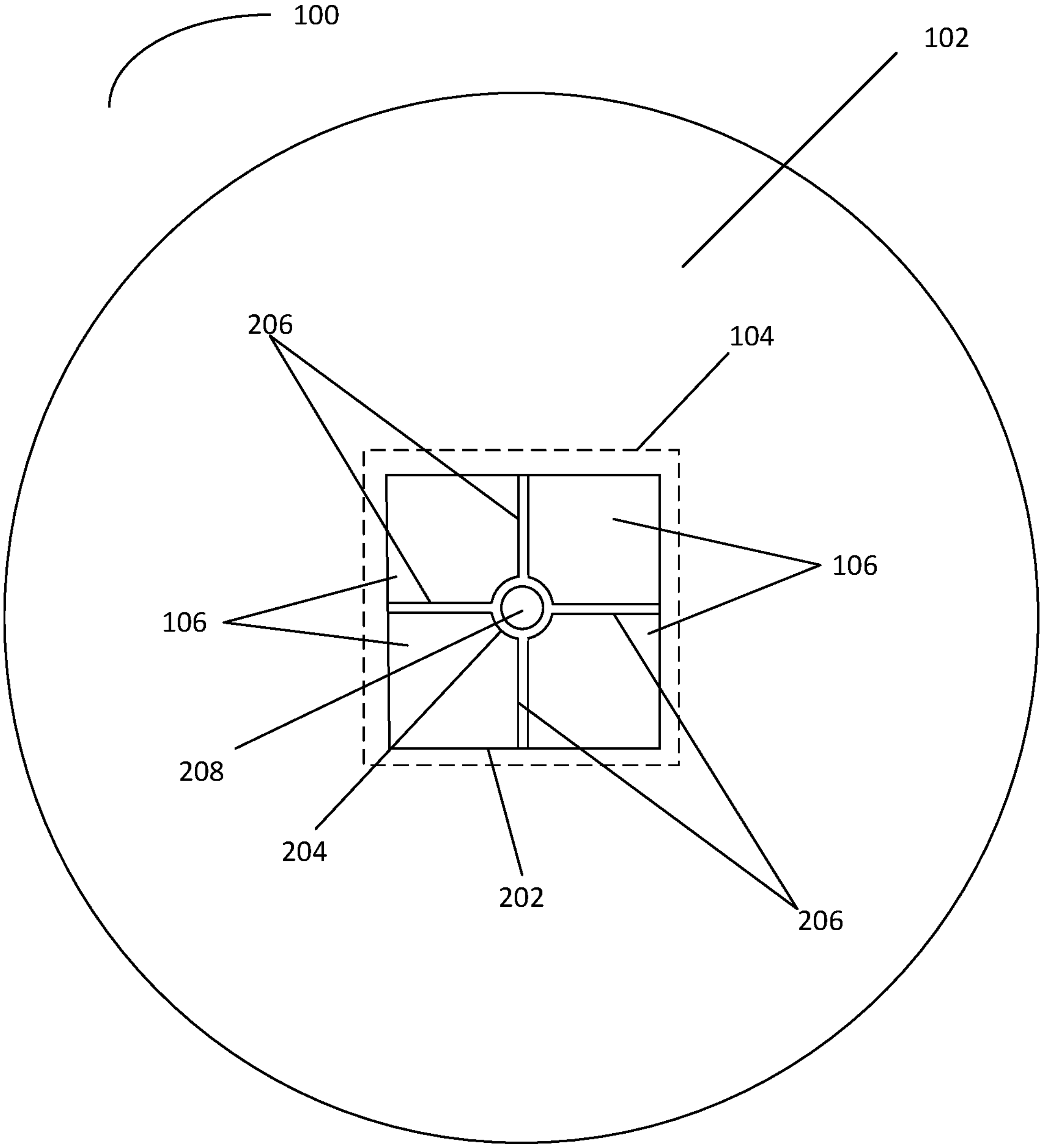
FIG. 4 depicts an alternate embodiment of the present device.

FIG. 4 depicts an alternate embodiment of the present device 100. In the embodiment depicted in FIG. 4, the outer ring 202 can have a substantially square shape. However, in alternate embodiments, the outer ring 202 can have any known convenient and/or desired geometry. Additionally, in the embodiment depicted in FIG. 4, the connecting members 206 can be positioned other than in alignment with the corners of the square shaped outer ring 202. In alternate embodiments, the number of connection members 206 can be increased (5, 6, 7, 8 . . . n).

Figure 5:
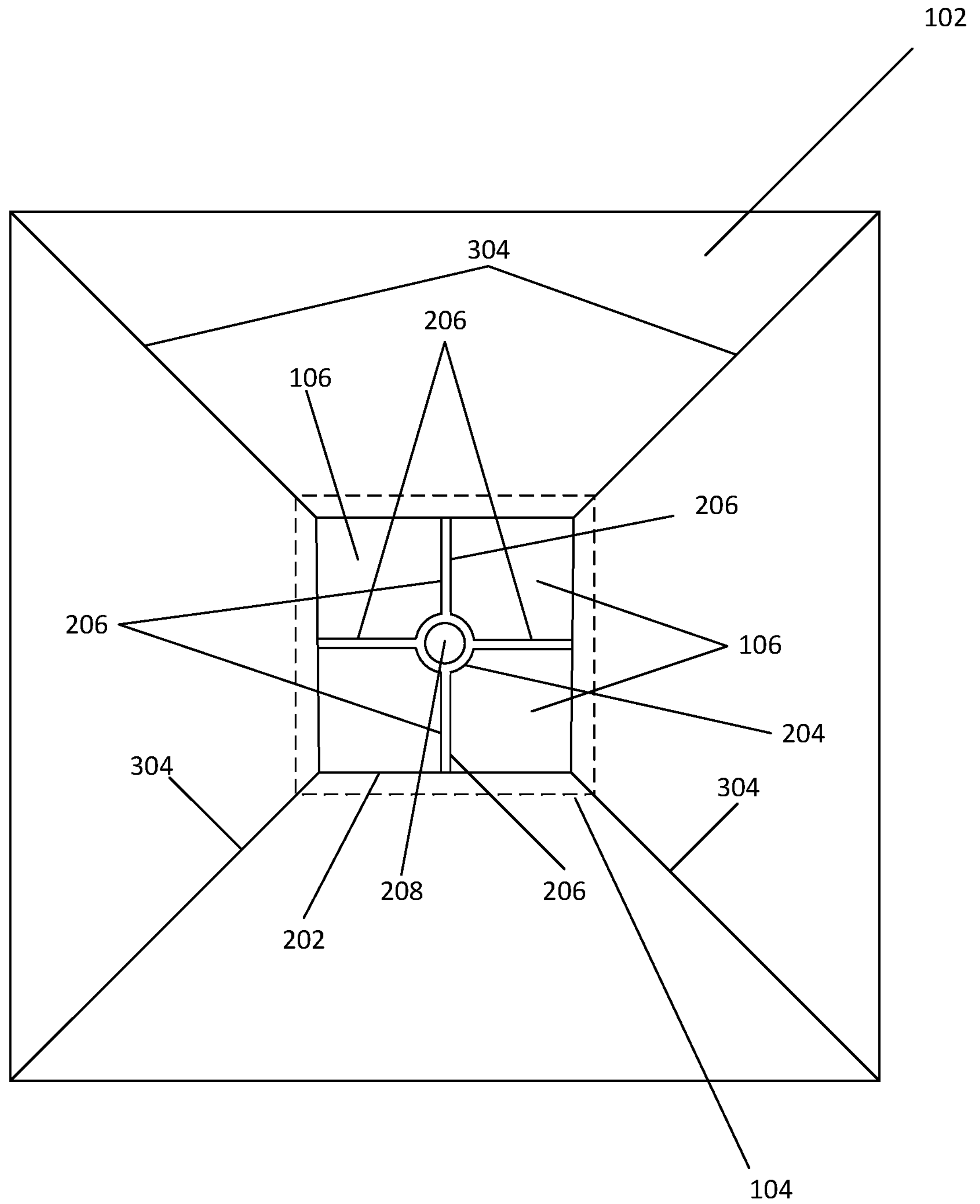
FIG. 5 depicts an alternate embodiment of the present device.

FIG. 5 depicts an alternate embodiment of the present device 100. In the embodiment depicted in FIG. 5, the outer ring 202 can have a substantially square shape and can comprise a truncated pyramidal funnel 302 which can have a plurality of surfaces which engage each other along a plurality of joints 304 and which couples with the outer ring 202. However, in alternate embodiments the outer funnel 102 and the outer ring 202 can each have any known, convenient and/or desired geometry. Additionally, in the embodiment depicted in FIG. 5, the connecting members 206 can be positioned other than in alignment with the corners of the square shaped outer ring 202. While depicted as a four-sided truncated pyramidal shape in FIG. 5, the funnel 302 can have any number (3, 4, 5, 6, 7, . . . , n) of known, convenient and/or desired planar or non-planar sides. In alternate embodiments, the number of connection members 206 can be increased (5, 6, 7, 8 . . . n).

Figure 6:
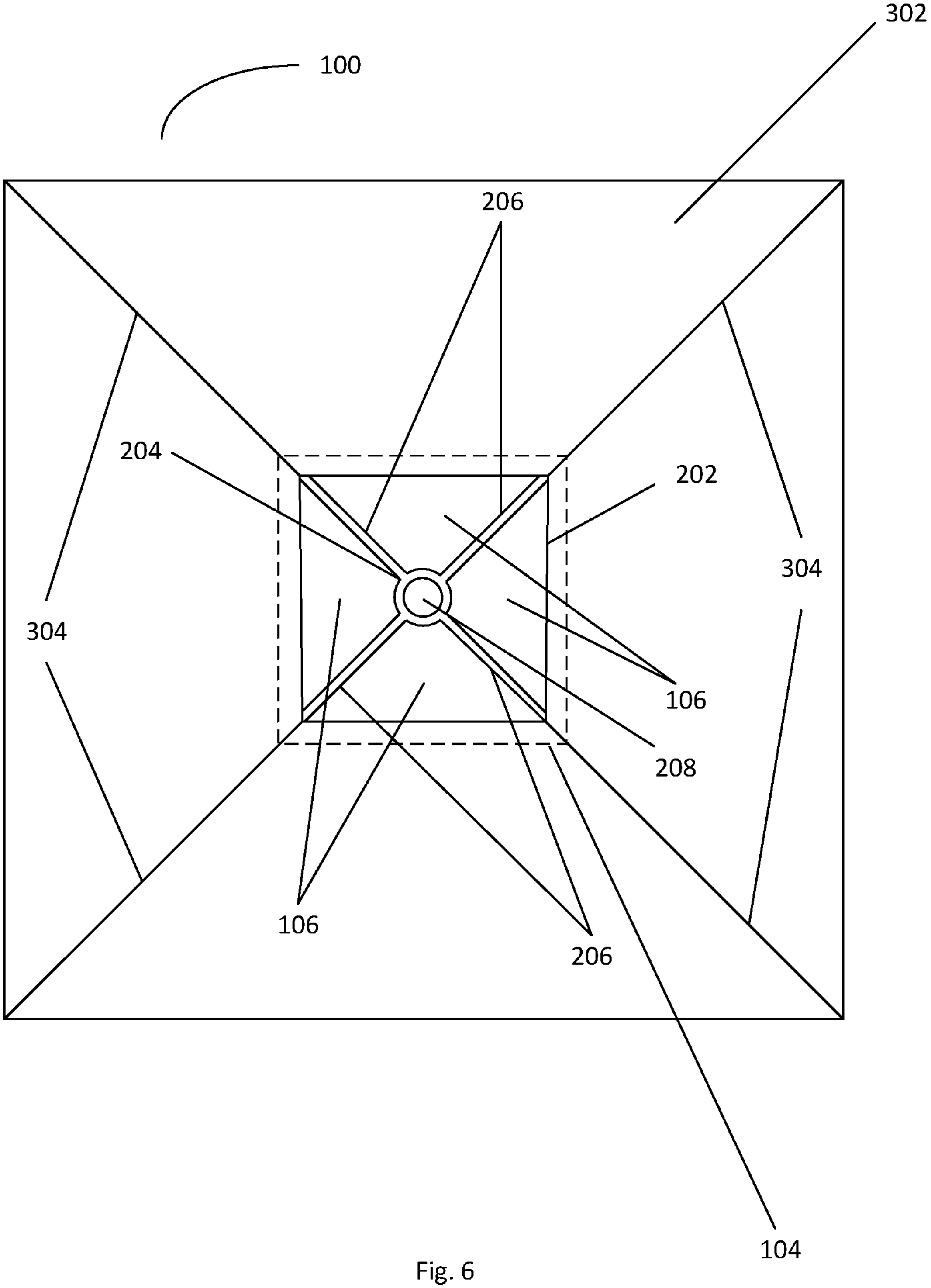
FIG. 6 depicts an alternate embodiment of the present device.

FIG. 6 depicts an alternate embodiment of the present device 100. In the embodiment depicted in FIG. 6, the outer ring 202 can have a substantially square shape and can comprise a truncated pyramidal funnel 302 which can have a plurality of surfaces which engage each other along a plurality of joints 304 and which couples with the outer ring 202. However, in alternate embodiments the outer funnel 102 and the outer ring 202 can each have any known, convenient and/or desired geometry. Additionally, in the embodiment depicted in FIG. 6, the connecting members 206 can be positioned to be in alignment with the corners of the square shaped outer ring 202. While depicted as a four-sided truncated pyramidal shape in FIG. 6, the funnel 302 can have any number (3, 4, 5, 6, 7, . . . , n) of known, convenient and/or desired planar or non-planar sides. In alternate embodiments, the number of connection members 206 can be increased (5, 6, 7, 8 . . . n).

Figure 7:
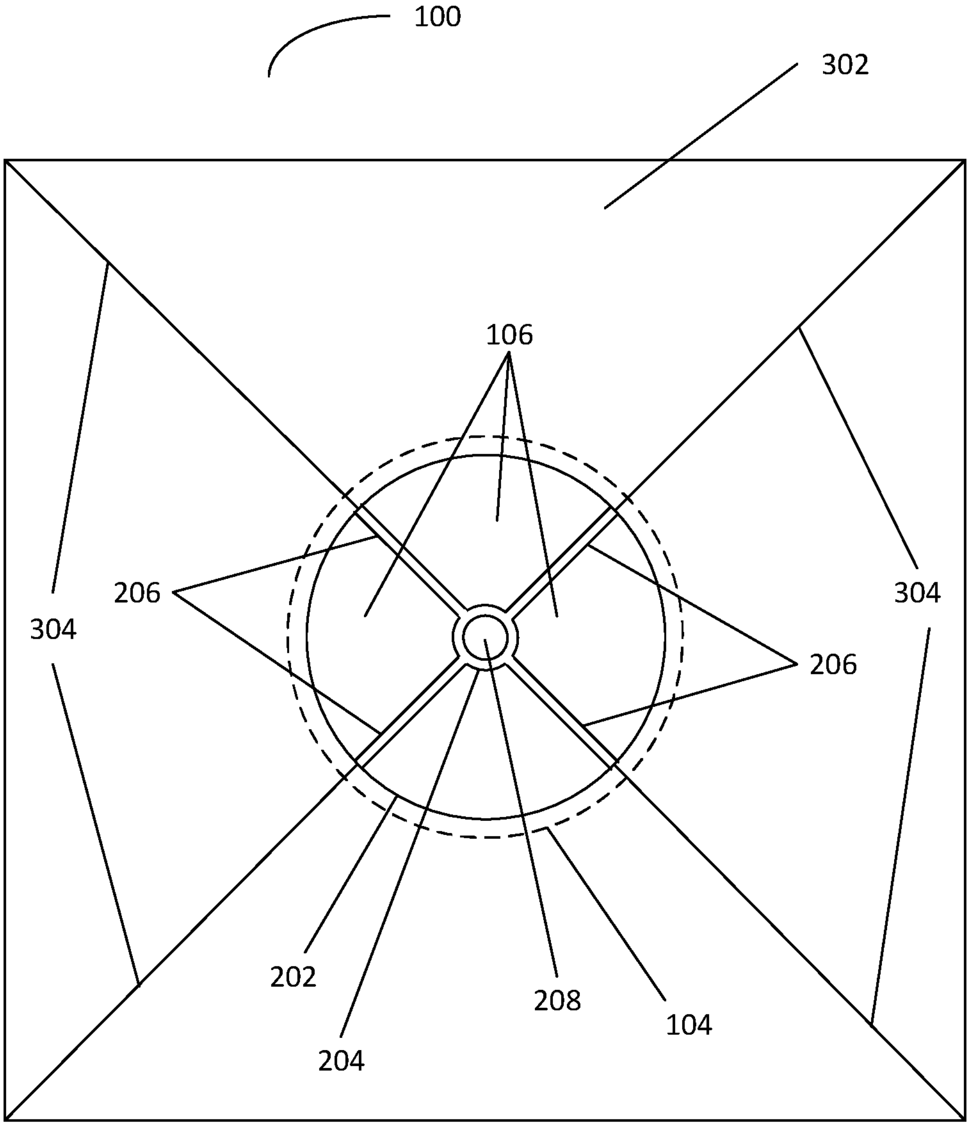
FIG. 7 depicts an alternate embodiment of the present device.

FIG. 7 depicts an alternate embodiment of the present device 100. In the embodiment depicted in FIG. 7, the outer funnel 102 can be an invented, truncated pyramidal funnel 302 which can have a plurality of surfaces which engage each other along a plurality of joints 304 and which couples with the outer ring 202. However, in alternate embodiments the outer funnel 102 can have any known, convenient and/or desired geometry. Additionally, in the embodiment depicted in FIG. 7, the connecting members 206 can be positioned in alignment with the joints 304. While depicted as a four-sided truncated pyramidal shape in FIG. 7, the funnel 302 can have any number (3, 4, 5, 6, 7, . . . , n) of known, convenient and/or desired planar or non-planar sides. In alternate embodiments, the number of connection members 206 can be increased (5, 6, 7, 8 . . . n).

Figure 8:
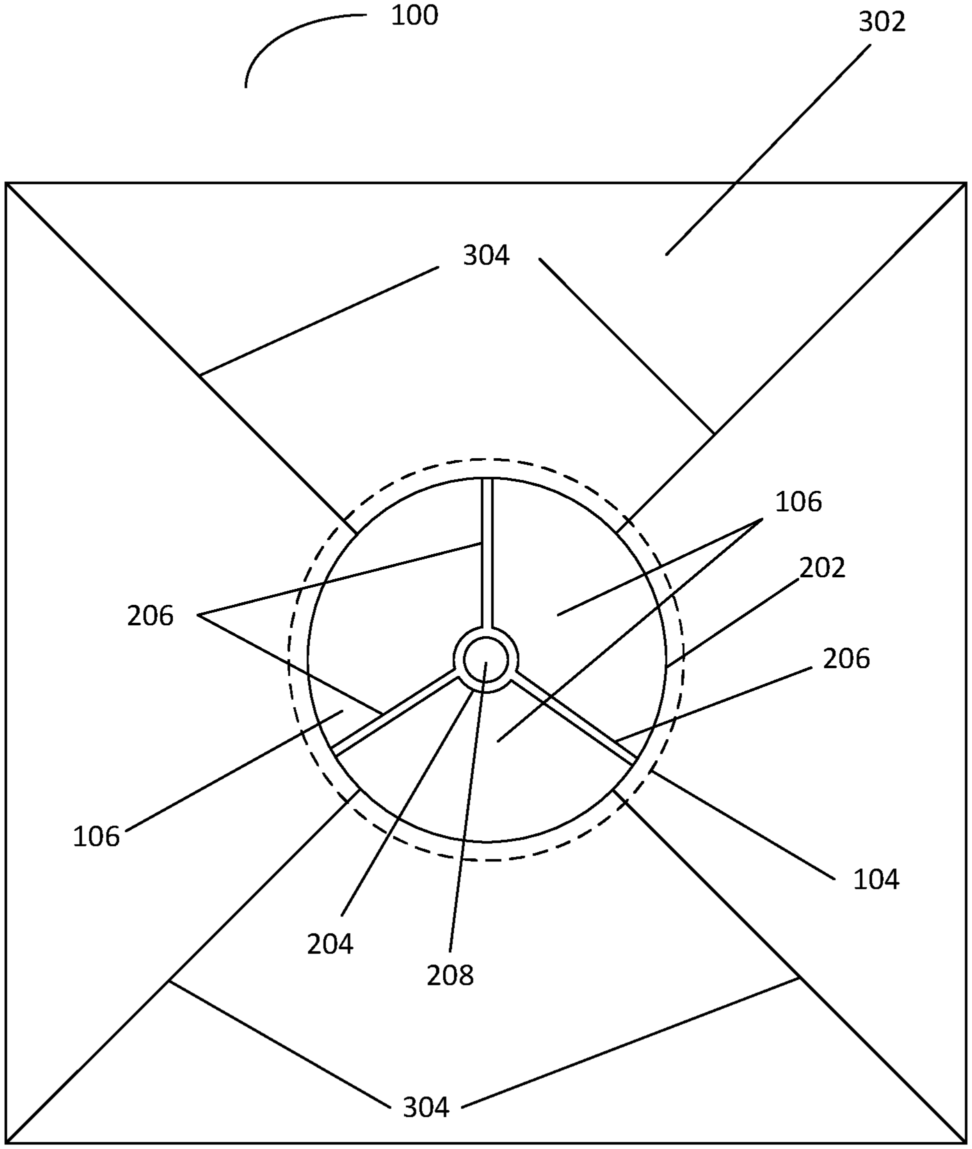
FIG. 8 depicts an alternate embodiment of the present device.

FIG. 8 depicts an alternate embodiment of the present device 100. In the embodiment depicted in FIG. 8, the outer funnel 102 can be an invented, truncated pyramidal funnel 302 which can have a plurality of surfaces which engage each other along a plurality of joints 304 and which couples with the outer ring 202. However, in alternate embodiments the outer funnel 102 can have any known, convenient and/or desired geometry. Additionally, in the embodiment depicted in FIG. 8, the number of connecting members 206 can be reduced and can be positioned other than in alignment with the joints 304. In alternate embodiments, the number of connection members 206 can be increased (5, 6, 7, 8 . . . n). While depicted as a four-sided truncated pyramidal shape in FIG. 8, the funnel 302 can have any number (3, 4, 5, 6, 7, . . . , n) of known, convenient and/or desired planar or non-planar sides.

Figure 9:
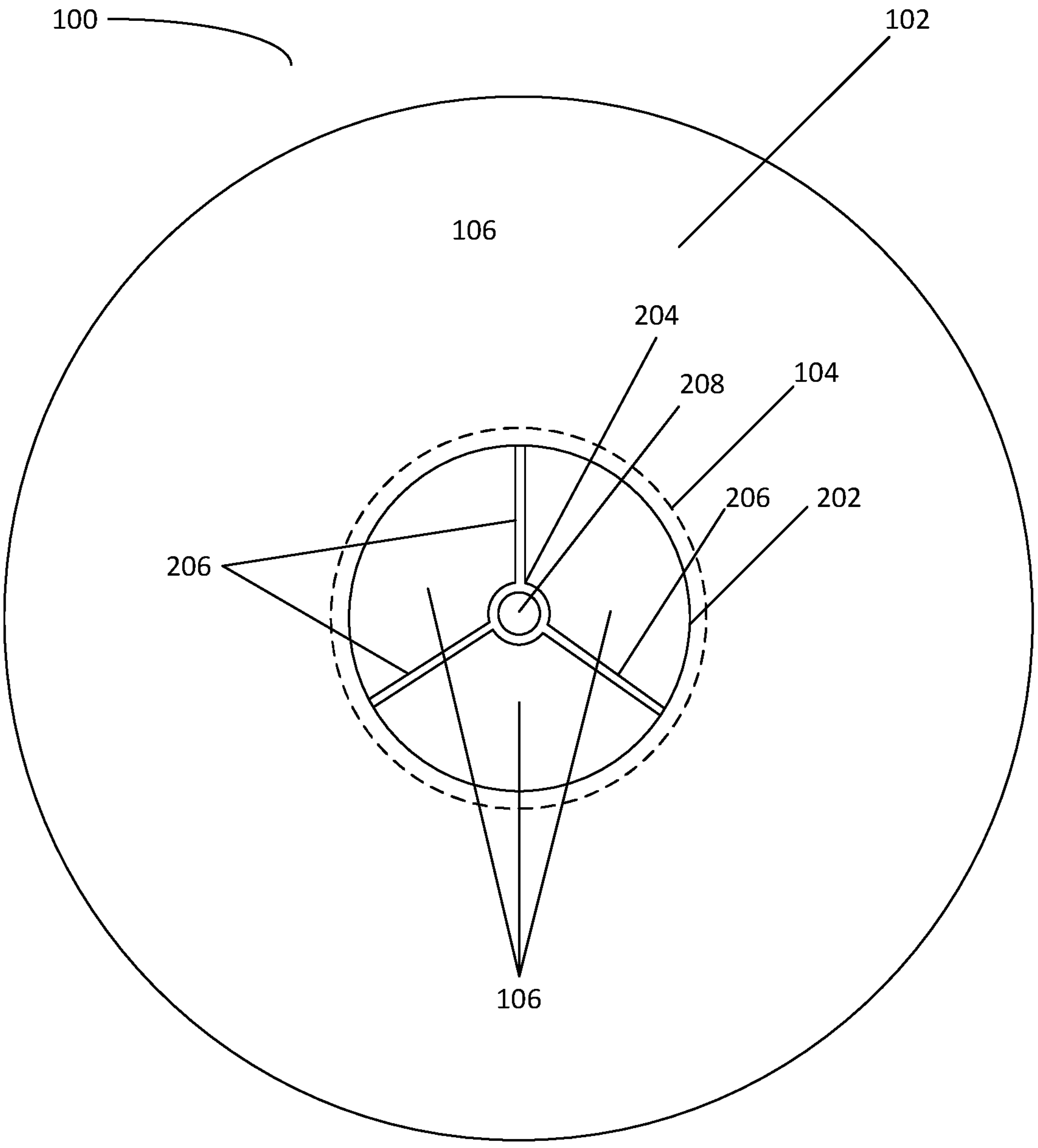
FIG. 9 depicts an alternate embodiment of the present device.

FIG. 9 depicts an alternate embodiment of the present device 100. FIG. 9 depicts an alternate embodiment of the present device 100. In the embodiment depicted in FIG. 8, the outer funnel 102 can be a truncated conical funnel 102 which couples with the outer ring 202 at its narrow diameter end. However, in alternate embodiments the outer funnel 102 can have any known, convenient and/or desired geometry. Additionally, in the embodiment depicted in FIG. 9, the number of connecting members 206 can be reduced and can be positioned in any known, convenient and/or desired orientation relative to the outer ring 202. In alternate embodiments, the number of connection members 206 can be increased (5, 6, 7, 8 . . . n).

Figure 10:
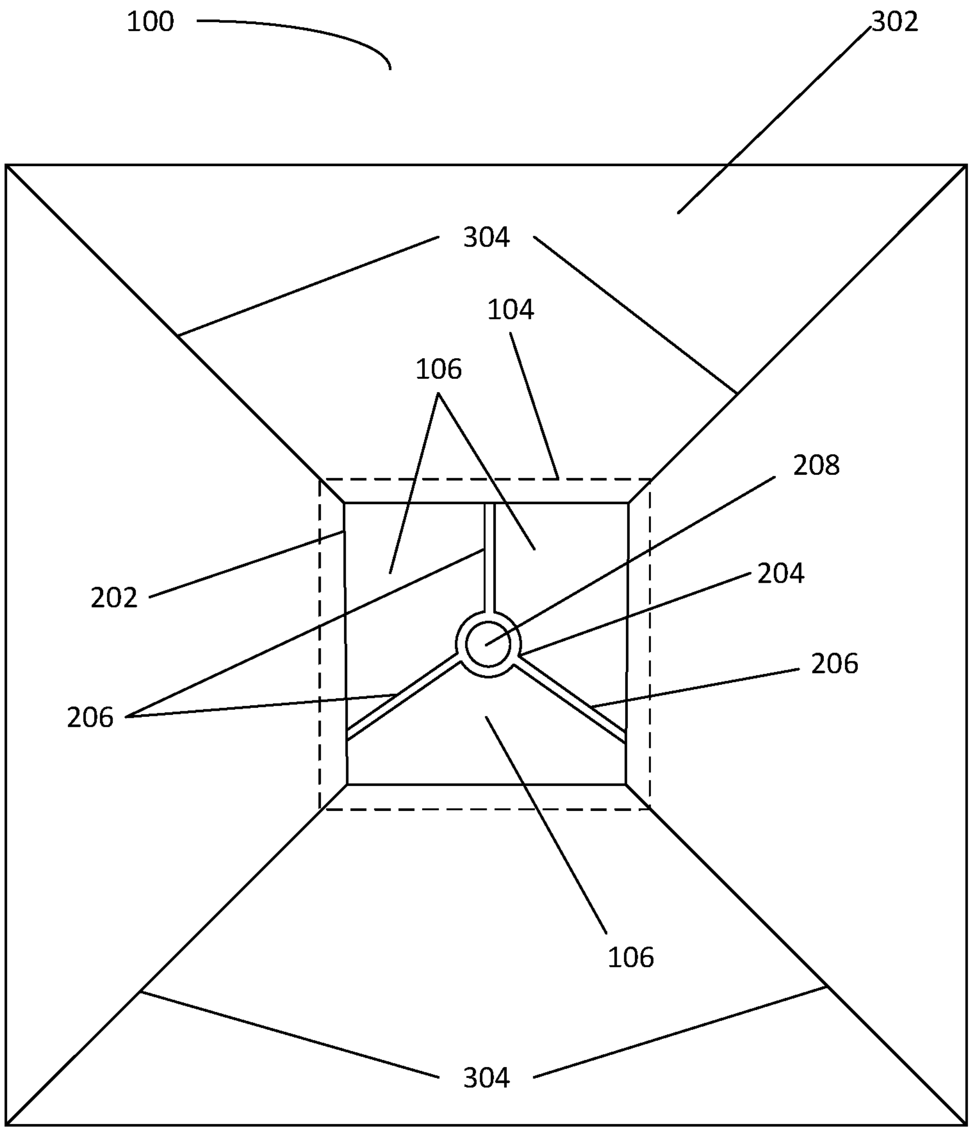
FIG. 10 depicts an alternate embodiment of the present device.

FIG. 10 depicts an alternate embodiment of the present device 100. FIG. 10 depicts an alternate embodiment of the present device 100. In the embodiment depicted in FIG. 10, the outer ring 202 can have a substantially square shape and can comprise a truncated pyramidal funnel 302 which can have a plurality of surfaces which engage each other along a plurality of joints 304 and which couples with the outer ring 202. However, in alternate embodiments the outer funnel 102 and the outer ring 202 can each have any known, convenient and/or desired geometry. Additionally, in the embodiment depicted in FIG. 10, the connecting members 206 can be positioned to be other than in alignment with the corners of the square shaped outer ring 202. While depicted as a four-sided truncated pyramidal shape in FIG. 10, the funnel 302 can have any number (3, 4, 5, 6, 7, . . . , n) of known, convenient and/or desired planar or non-planar sides. In alternate embodiments, the number of connection members 206 can be increased (4, 5, 6, 7, 8 . . . n).

Figure 11:
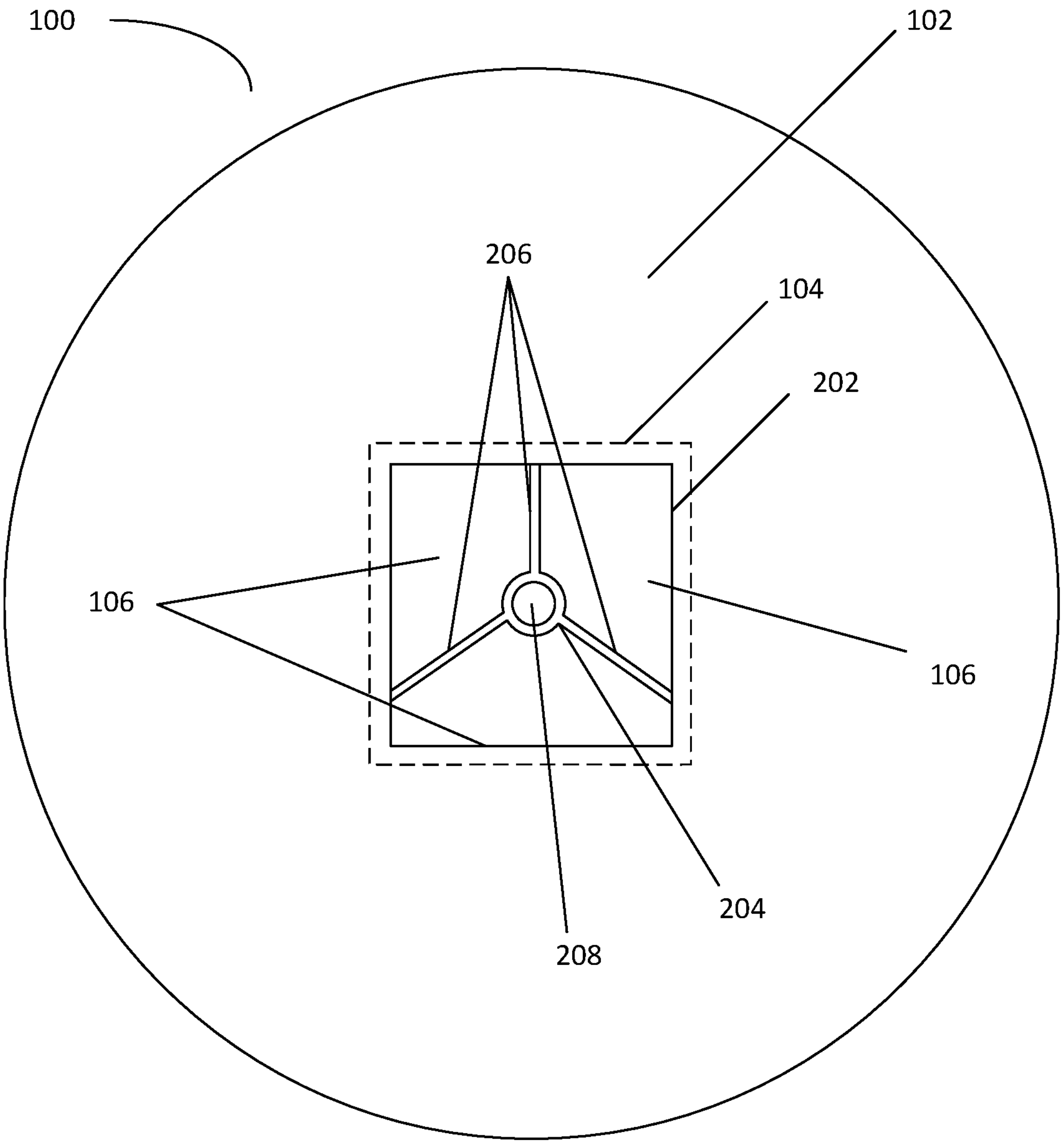
FIG. 11 depicts an alternate embodiment of the present device.
Figures 12, 12A, 12B, 12C, 12D, 12E, 12F:
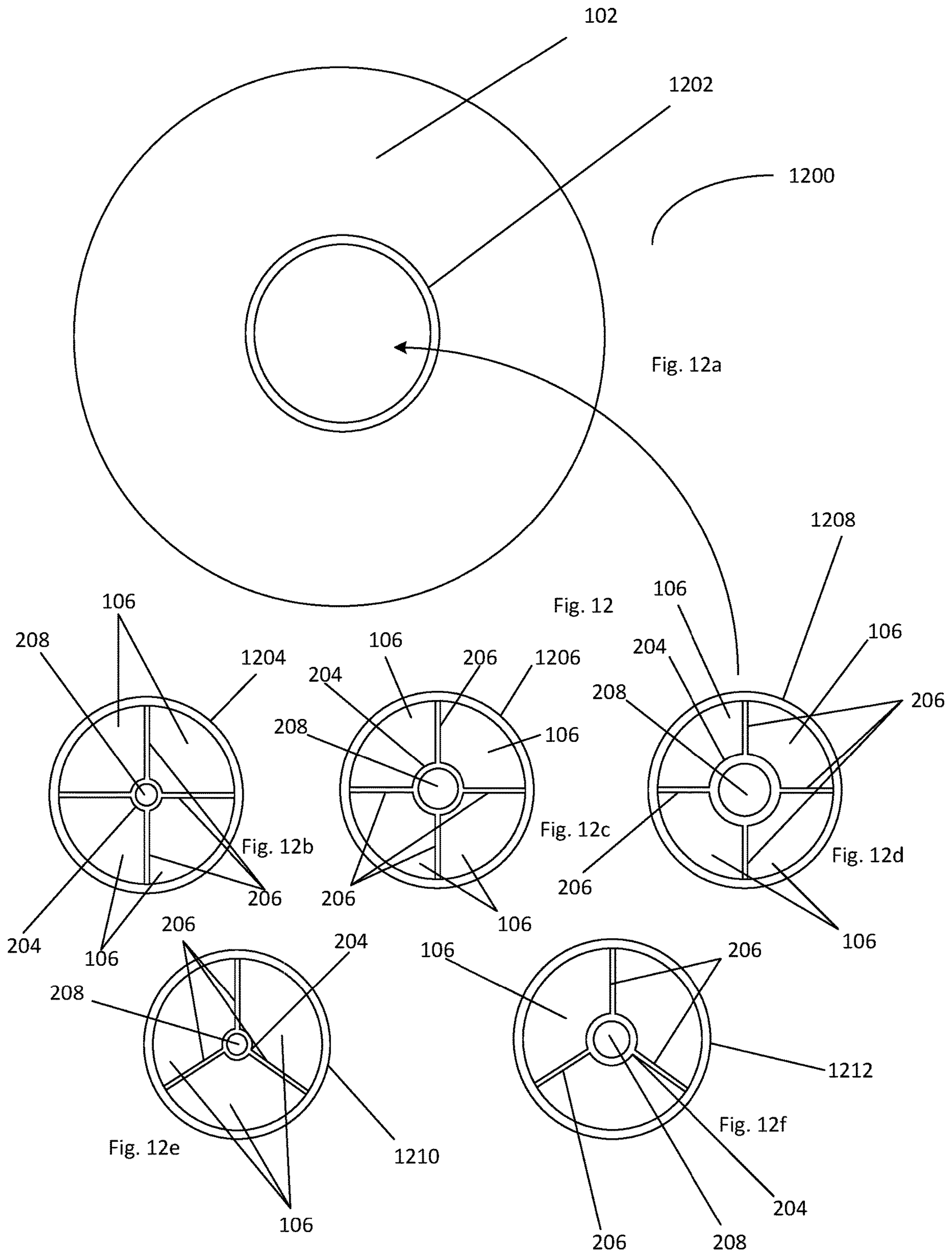
FIGS. 12*a*-12*f* depict an alternate embodiment of a system or kit embodying the present device.

FIG. 11 depicts an alternate embodiment of the present device 100. FIG. 11 depicts an alternate embodiment of the present device 100. In the embodiment depicted in FIG. 11, the outer ring 202 can have a substantially square shape. However, in alternate embodiments, the outer ring 202 can have any known convenient and/or desired geometry. Additionally, in the embodiment depicted in FIG. 11, the connecting members 206 can be positioned other than in alignment with the corners of the square shaped outer ring 202. In alternate embodiments, the number of connection members 206 can be increased (4, 5, 6, 7, 8 . . . n).

FIGS. 12*a*-12*f* depict an alternate embodiment of a system or kit 1200 embodying the present device 100. In the embodiment depicted in FIGS. 12*a*-12*f*, the system or kit 1200 embodying the present device 100 can comprise a funnel component 102 wherein the funnel 102 comprises a support ridge 1202 on the interior of the narrow end of the funnel 102. The support ridge 1202 is adapted and configured to selectively engage and support a desired one of a plurality of trapping units 1204, 1206, 1208, 1210, 1212 having a plurality of differing geometric configurations. In some embodiments the differing configurations can comprise trapping units with inner rings of differing diameters and thicknesses and/or trapping units with varying quantities of connection member 206. While depicted as circular, in alternate embodiments both the funnel 102 and/or the support ridge 1202 can have any known, convenient and/or desired geometries and the shape of the various trapping units 1204, 1206, 1208, 1210, 1212 having a plurality of complimentary geometric configurations. Additionally in alternate embodiments, the number of connection members 206 can be increased (4, 5, 6, 7, 8 . . . n).

In operation, a trapping unit 1204, 1206, 1208, 1210, 1212 can be selectively and removably coupled with the support ridge 1202 at the narrow end of the funnel 102 to selectively construct a device 100 having a desired configuration and desired trapping unit 1204, 1206, 1208, 1210, 1212.

FIGS. 13*a*-13*h* depict an alternate embodiment of an alternate system or kit 1300 embodying the present device 100. In the embodiment depicted in FIGS. 13*a*-13*h*, the system or kit 1300 embodying the present device 100 can comprise a funnel component 102 wherein the funnel 102 comprises a support ridge 1202 on the interior of the narrow end of the funnel 102. The support ridge 1202 is adapted and configured to selectively engage and support a desired one of a plurality of support elements 13*bi* and 13*bii* having a plurality of differing geometric configurations. While support elements 13*bi* and 13*bii* are depicted as comprising three and four connection members 206, respectively, in alternate embodiments a support element can have any known, convenient and/or desired number of connection members. In the embodiment depicted in FIGS. 13*bi* and 13*bii*, the connection members extend internally from and are cantilever supported on the outer ring 202.

Figures 13E, 13H:
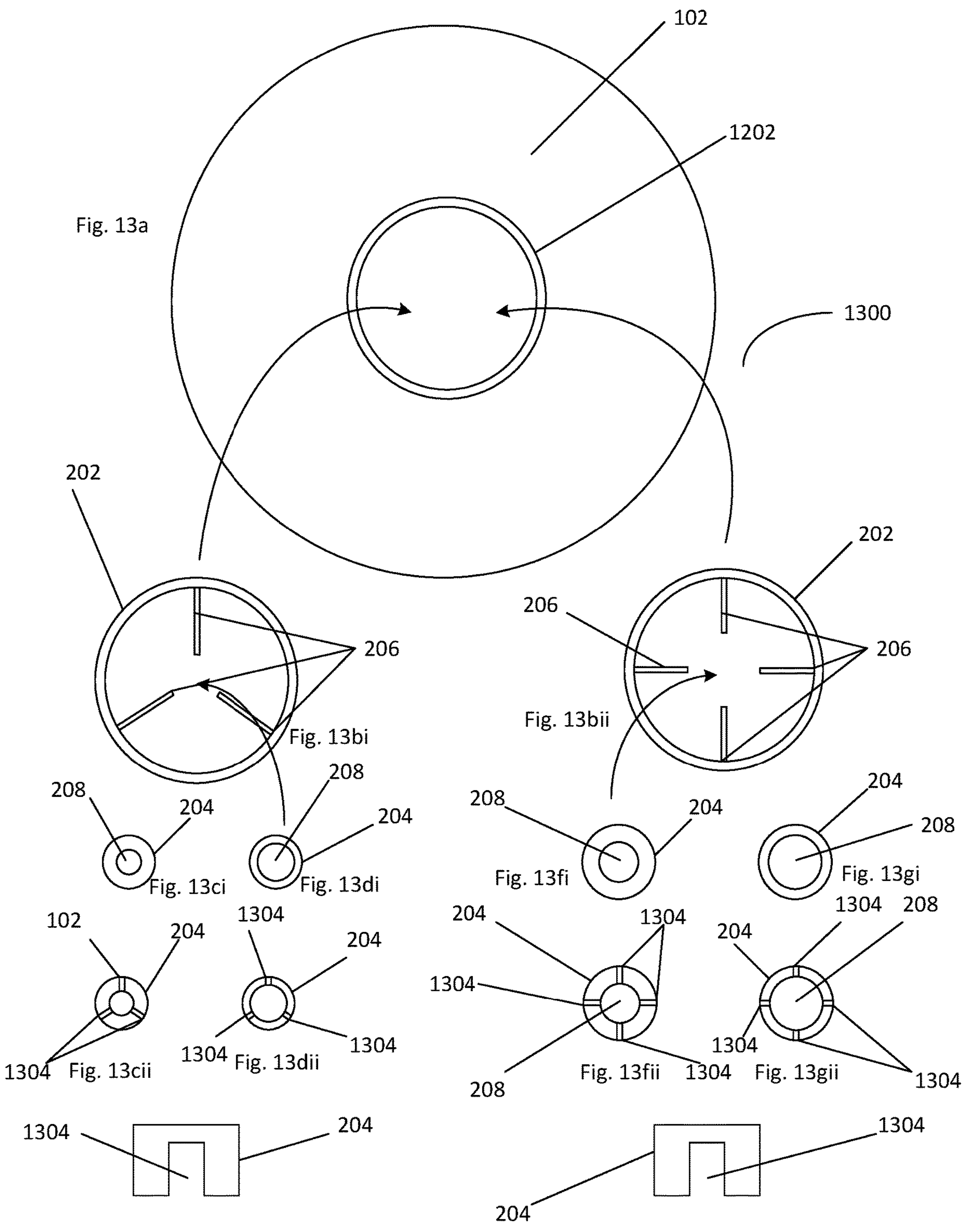

FIGS. 13*ci* and 13*di* depict top views of inner rings 204 and FIGS. 13*cii* and 13*dii* depict bottom view of the inner rings 204. Each of the undersides of the inner rings 204 comprise slots 1304 that are adapted and configured to selectively engage and be supported by the associated connection members 206 of the inner ring depicted in FIG. 13*bi*. FIG. 13*e* depicts an elevation view of a slot 1304 in the inner ring 204.

FIGS. 13*fi* and 13*gi* depict top views of inner rings 204 and FIGS. 13*fii* and 13*gii* depict bottom view of the inner rings 204. Each of the undersides of the inner rings 204 comprise slots 1304 that are adapted and configured to selectively engage and be supported by the associated connection members 206 of the inner ring depicted in FIG. 13*bii*. FIG. 13*h* depicts an elevation view of a slot 1304 in the inner ring 204.

In operation, a desired inner ring 204 can be selectively coupled with the connection members of an associated outer ring 202 and the assembly can then be selectively coupled with the support ridge 1202 to facilitate construction of a device 100 having any one of a plurality of known, convenient and/or desired configurations.

Overall in operation, a receptacle can be placed in central ring 204 and a container can be coupled with the underside (narrow end) of the device 100. A user can then introduce and direct a funneled substance into the device 100 toward the receptacle. Any of the funneled substance that is not captured by the receptacle can bypass the receptacle and fall through the apertures 106 into the container on which the device rests and can be recovered.

Although exemplary embodiments of the invention have been described in detail and in language specific to structural features and/or methodological acts above, it is to be understood that those skilled in the art will readily appreciate that many additional modifications are possible in the exemplary embodiments without materially departing from the novel teachings and advantages of the invention. Moreover, although the drawings depict specific dimensions, it should be noted and understood that the apparatus can be made and function using various alternate dimensions and geometries. Additionally, it is to be understood that the subject matter defined in the appended claims is not necessarily limited to the specific features or acts described above. Accordingly, these and all such modifications are intended to be included within the scope of this invention construed in breadth and scope in accordance with the appended claims.

What is claimed is:

1. A cone-filling device comprising:

an outer funnel removably connected to a trapping unit, wherein said trapping unit further comprises:

an outer ring;

an inner ring; and a plurality of connecting members extending radially inward from said outer ring to said inner ring of said trapping unit to connect with said inner ring, said inner ring being arranged substantially concentrically with said outer ring, such that said inner ring and outer ring are non-coplanar.

2. The device of claim 1, wherein said outer funnel and said trapping unit have a substantially circular geometry.

3. The device of claim 1, wherein said outer funnel has a truncated pyramidal geometry.

4. The device of claim 3, wherein said outer ring of said trapping unit has a substantially square geometry.

5. A cone-filling device kit, comprising:

an outer funnel component, further comprising a support ridge on the interior of the narrow end of said funnel;

a plurality of interchangeable trapping units of differing geometrical configurations each said trapping unit having an outer ring and an inner ring; and a plurality of connecting members extending radially inward from said outer ring to said inner ring of said trapping unit to removably connect with said inner ring, said inner ring being arranged substantially concentrically with said outer ring;

wherein said support ridge is adapted and configured to selectively engage and support a desired said trapping unit via said outer ring of said trapping unit; and wherein said inner ring further comprises slots adapted and configured to selectively engage and be supported by said connecting members.

* * * * *